Patented Aug. 31, 1948

2,448,160

UNITED STATES PATENT OFFICE 2,448,160

TREATMENT OF HYDROCARBONS

Charles L. Thomas, Winnetka, and Vladimir Haensel, Clarendon Hills, Ill., assignors to Universal Oil Products Company, Chicago, Ill., a corporation of Delaware No Drawing. Original application February 20, 1939, Serial No. 257,464. Divided and this application June 8, 1946, Serial No. 675,328

5 Claims. (Cl. 260—671)

This application is a division of our copending application Serial No. 257,464 filed February 20, 1939, now Patent No. 2,410,111, October 29, 1946.

This invention relates particularly to the manufacture of alkylated aromatic hydrocarbons, and in a more specific sense has reference to a process of contacting aromatic hydrocarbons with olefinic hydrocarbons or substances capable of producing olefinic hydrocarbons in situ with catalysts whereby to produce alkylated aromatic hydrocarbons which may be used as such, as components of motor fuel, or as intermediates in organic syntheses.

It is a noteworthy fact in any particular organic reaction involving the decomposition of single compounds, or the interaction of two or more compounds, that many times the reaction velocity constants are of a low order under moderate conditions of temperature and pressure corresponding to a low order of secondary or side reactions, these latter resulting in the alteration of the primary desired products. For different reactions catalysts of extremely variable character have been found empirically which accelerate the reaction sufficiently so that a laboratory process can be operated upon a commercial scale.

Very few rules have been evolved which enable the prediction of the catalytic activity of any substance in a given organic reaction or the selection of a particular substance for a particular reaction. Metals, metal oxides, metal salts, and various acids and alkalies, and substances of an ordinarily inert character, which furnish an absorbent contacting surface, have been tried and in different instances have proved effective. The type of catalysts which characterizes the process of the present invention is of an absorptive character and comprises preferably synthetically prepared masses of silica and oxides selected from the group comprising alumina, zirconia, and thoria.

In one specific embodiment the present invention comprises subjecting aromatic hydrocarbons and olefins or substances capable of producing olefins in situ, to contact with catalysts comprising synthetically prepared composite masses of silica and one or more of alumina, zirconia, and thoria at an elevated temperature, whereby to produce substantial yields of alkylated aromatic hydrocarbons.

According to the process of the present invention mixtures of aromatic and olefinic hydrocarbons are contacted with the above mentioned silica-base catalysts at temperatures in the approximate range of 350–850° F. preferably under pressures in the range of 500–2000 pounds per square inch, under which conditions substantial proportions of the reactants are converted into alkylated aromatic hydrocarbons, the monoalkylated derivatives generally being in preponderance.

The preferred silica-base alkylation catalysts may be prepared by a number of alternative methods which have certain necessary features in common, as will subsequently be described.

Generally speaking, however, the catalysts may be considered to comprise intimate molecular combinations of silica with alumina, zirconia, and/or thoria, all of which components possess more or less low activity individually but display high activity in the aggregate. Their activity is not an additive function, it being relatively constant for a wide range of proportions of the components whether in molecular proportions or fractions of molecular proportions. No one component may be determined as the one component for which the remaining components may be considered as the promoters according to conventional terminology, nor can any component be definitely stated to be the support and the others as the catalyst proper.

According to one general method of preparation the preferred silica-base alkylation catalysts may be prepared by precipitating silica from solution as a hydrogel and subsequently admixing or depositing the hydrogels of alumina, zirconia, and/or thoria upon the hydrated silica. One of the more convenient methods of preparing the silica hydrogel is to acidify an aqueous solution of sodium silicate by the addition of an acid, such as hydrochloric acid, for example. The excess acid and the concentration of the solution in which the precipitation is brought about determine in some measure the suitability of the silica hydrogel for subsequent deposition of the hydrogels of alumina, zirconia, and/or thoria. In general, suitable hydrated silica may be produced by the use of dilute solutions of sodium silicate and the addition of a moderate excess of acid whereby the desired active silica gel is obtained and conditions of filtering and washing are at an optimum.

After precipitating the silica hydrogel, it is treated and washed to substantially remove alkali metal ions. It is not known whether the alkali metal ions, such as sodium ions, are present in the primary gel in chemical combination, or in an adsorbed state but it has been determined definitely that their removal is necessary if catalysts are to be obtained suitable for prolonged use in accelerating hydrocarbon conversion reactions of the present character. It is possible that the presence of the alkali metal impurities causes a sintering or fluxing of the surfaces of the catalyst at elevated temperatures so that the porosity is much reduced with corresponding reduction in effective surface. Alkali metal ions may be removed by treating with solutions of acidic materials, ammonium salts, or salts of aluminum, zirconium, and/or thorium. When treating with acids, as for example with hydrochloric acid, the acid extracts the alkali metal impurities in the silica gel. The salts formed and acid are then substantially completely removed by water washing treatment. Where ammonium salts, or salts of aluminum, zirconium, and/or thorium are used, the ammonium or multivalent metals used apparently displace the alkali metal impurities present in the composite and the alkali metal salts formed, together with the major portion of the multivalent salts, are removed in the water washing treatment. Some of the multivalent metals introduced into the silica hydrogel in the purifying treatment may become a permanent part of the composite, whereas in the treatment with ammonium salts small amounts of the ammonium salts remaining after the washing process will be driven off in subsequent treatment at elevated temperatures.

In one of the preferred methods of compositing the hydrogel materials, the purified precipitated hydrated silica gel may be suspended in a solution of aluminum, zirconium, and/or thorium salts in the desired proportion and the alumina, zirconia, and/or thoria hydrogel deposited upon the suspended silica hydrogel by the addition of volatile basic precipitants, such as ammonium hydroxide, ammonium carbonate, ammonium hydrosulfide, ammonium sulfide, or other materials such as organic bases may be employed. According to this method, the purified silica gel may be suspended in a solution of aluminum chloride, zirconyl nitrate, and/or thorium nitrate, for example, and the hydrated alumina, zirconia, and/or thoria precipitated by the addition of ammonium hydroxide. In this example, the alumina, zirconia, and/or thoria are co-precipitated.

Alternatively the purified silica gel may be mixed while in the wet condition with separately prepared hydrated alumina, hydrated zirconia and/or hydrated thoria precipitated either separately or concurrently, as for example by the addition of volatile basic precipitants to solutions of aluminum, zirconium, and/or thorium salts. The hydrated alumina, hydrated zirconia, and/or hydrated thoria thus prepared are substantially free from alkali metal ions and can be mixed with purified silica gel. However, if alkali metal ions are incorporated as when the hydrated alumina is prepared from sodium aluminate, for example, or if zirconium and/or thorium tetrahydroxides are precipitated by the interaction of zirconyl nitrate and/or thorium nitrate and sodium hydroxide, regulated purification treatment and water washing, by methods selected from those described in connection with the purification of hydrated silica gel to remove alkali metal ions will be required. Care should be observed in the selection and concentration of reagents used so as not to dissolve unduly large amounts of alumina, zirconia and/or thoria.

As further alternatives in the preparation of silica-base alkylation catalysts, purified silica gel may be added to a solution of salts of aluminum, zirconium, and/or thorium and hydrated alumina, hydrated zirconia, and/or hydrated thoria deposited by hydrolysis with or without the use of heat, or the purified silica gel may be mixed with suitable amounts of salts of aluminum, zirconium, and/or thorium as, for example, to form a paste and heated whereby alumina, zirconia, and/or thoria are deposited upon the silica gel as a result of the decomposition of the alumina, zirconia, and/or thorium salts.

In the methods above described, a silica hydrogel free from alkali metal ions was admixed or had deposited thereon relatively pure hydrated alumina, hydrated zirconia, and/or hydrated thoria prior to the drying treatment. In methods described below, the hydrated silica with a hydrated alumina, hydrated zirconia, and/or hydrated thoria are concurrently precipitated or admixed and treated to remove the alkali metal ions from the composited material prior to drying treatment, either in the presence of the original reactants or subsequent to water washing. Thus, solutions of silicon compounds, more usually alkali metal silicates and soluble aluminum, zirconium, and/or thorium salts may be mixed under regulated conditions of acidity or basicity to jointly precipitate hydrated silica, hydrated alumina, hydrated zirconia, and/or hydrated thoria in varying proportions. For example, solutions of sodium silicate, aluminum chloride, zirconyl nitrate, and/or thorium nitrate may be mixed and an alkaline or acid reagent added according to the proportions used so that in the mix a pH in the range of 3–10 is obtained. In cases where a sol is formed, the precipitation may be brought about if the sol is acid by the addition of a volatile base, as for example, ammonium hydroxide, and alkali metal salts removed by water washing, or the composite may be treated as indicated above in connection with the purification of the hydrated silicia to remove alkali metal ions. Various methods are possible for the preparation of the hydrated silica, hydrated alumina, hydrated zirconia, and/or hydrated thoria separately or in combination and the purifying treatment is always necessary where alkali metal ions are present in substantial amounts.

The character and efficiency of the ultimately prepared silicia catalyst supports will vary more or less with precipitation and/or mixing, purification treatment, ratio of components, calcining, etc. a specific example being given below. The ratio of the components may be varied within wide limits, the limiting factor being more in evidence with respect to small proportions than with large proportions of the various components. In general, it appears that 2–6 mole percent of alumina, zirconia, and/or thoria together with reference to silica may be considered an approximation of the minimum porportions.

After the alumina, zirconia, and/or thoria have been mixed with or deposited on the purified silica gel and water washed, if desired, as described for one general method of preparation, or after the hydrated silica, hydrated alumina, hydrated zirconia, and/or hydrated thoria have been composited and treated to remove the alkali metal ions, as described for another general method of preparation, the catalytic materials may be recovered as a filter cake and dried at a temperature in the order of 240–300° F., more or less, after which they may be formed into particles of a suitable average definite size ranging from powder to various forms and sizes obtained by pressing and screening, or otherwise formed into desirable shapes by compression or extrusion methods.

By calcining at temperature of the order of approximately 850–1000° F., or higher, the maximum activity of the silica-base alkylation catalyst is obtained and a further dehydration occurs so that, for example, after a considerable period of heating at 900° F., the water content, as determined by analysis, is of the order of 2–3%.

Silica-base alkylating catalysts prepared by the various types of procedures outlined above evidently possess large total contact surfaces corresponding to a desirable porosity, the pores of the catalyst particles being of such size and shape that they do not become clogged with carbonaceous deposit after a long period of service and are, therefore, not difficult to reactivate by oxidation. This structure is retained, also, after many alternate periods of use and reactivation, as evidenced by the fact that the catalysts may be reactivated rapidly by passing air or other oxidizing gas over the used particles to burn off the deposits of carbonaceous materials at temperatures above 800° F., temperatures as high as 1400–1600° F., having been reached without apparently affecting the catalytic activity.

Contrasting the action of silica-base catalysts for alkylating aromatic hydrocarbons by olefins with the action of sulfuric acid used for the same purpose, it has been found that the synthetic silica-base catalysts have a more moderate and controllable action with substantially no tendency to oxidize or unduly promote polymerization reactions at the expense of the desired alkylation. This is particularly in evidence in the case of the iso-olefins. When using sulfuric acid and alkylating with gaseous olefin mixtures, such as those produced as by-products in oil cracking reactions, the polymerization reactions may proceed to the extent of forming polymers of too high molecular weight and boiling point for use in commercial motor fuels and may even produce gummy and resinous polymers which are insoluble and entirely objectionable for this reason. It is not to be inferred, however, that polymerization can be obviated entirely when using synthetic silica-base catalysts.

The reactions between aromatic hydrocarbons and olefinic hydrocarbons in the presence of synthetic silica-base catalysts are fundamentally of a simpler character. The following equation may represent the course of a typical reaction between a mono-olefin and an aromatic hydrocarbon in the presence of catalysts of the present character:

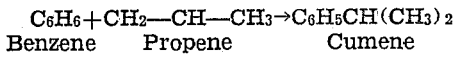

$$C_6H_6 + CH_2\text{---}CH\text{---}CH_3 \rightarrow C_6H_5CH(CH_3)_2$$
Benzene      Propene           Cumene This equation shows that the union of one molecule each of benzene and propene produces cumene, otherwise known as isopropylbenzene. The reaction may proceed further to the production of di-alkylated and poly-alkylated derivatives depending upon conditions of operation, the relative proportions of olefin and aromatic hydrocarbons, and the usual controlling factors such as temperature, pressure, activity of catalysts, and time of contact.

The process of this invention may also be carried out by mixing the olefinic hydrocarbon (or substance such as alcohol, ether, or ester, capable of forming such olefin in situ) with a molar excess, usually approximately 2–4 times its molar equivalent, of aromatic hydrocarbon and then passing the resulting solution through a suitable tower or chamber containing the granular synthetic silica-base catalyst maintained at a temperature in the approximate range of 350–850° F. Also the aromatic hydrocarbon and other reactant may be introduced simultaneously into the catalyst chamber from separate sources.

The catalyst may also be in the form of a fine powder that moves with the reacting materials through a heated chamber or reaction zone under elevated pressures preferably in the range of 500–2000 pounds per square inch. While it is at times desirable to operate the process of this invention at various temperatures and pressures throughout the range indicated above, it is not implied that these different conditions of operation are equal or equivalent, nor that their use necessarily leads to the production of alkylation products in the same proportions or of the same character. It is usual that a particular choice of conditions favors the production of a major proportion of some one or another desired reaction product.

The following examples are given to illustrate the character of the results obtained by the use of the process of the present invention, although the data presented are only from selected cases and are not introduced with the intent of restricting unduly the scope of the invention.

*Example 1*

An alkylation catalyst prepared according to the process of the present invention comprised approximately 92% silica and 8% alumina on a dry basis. The general procedure observed in preparing this catalyst was to precipitate a silica gel and to free it from alkali metal ions by washing with aluminum chloride solution and to mix the purified silica with alumina precipitated from an aluminum chloride solution by the use of ammonium hydroxide. 550 parts by weight of waterglass was dissolved in 4000 volumes of water and approximately 75 volumes of 2.5 molar hydrochloric acid was added gradually while agitating. The precipitation was thus carried out in an alkaline medium until finally when all the acid had been added the liquor became acidic to litmus. The precipitated hydrogel was then filtered and washed twice using approximately 3000 volumes of water per batch. Subsequent washing was with 1500 volumes of water containing 27 parts by weight of aluminum chloride hexahydrate. Then 29 parts by weight of aluminum chloride hexahydrate were dissolved in 1500 volumes of water. The silica prepared and purified, as indicated above, was suspended in this aluminum chloride solution and 6.6 volumes of ammonium hydroxide was added slowly while agitating until the reaction mixture was alkaline to litmus. The precipitated mass was then filtered and washed four times with 2000–3500 volumes of water. The filter cake was dried and a portion of it prepared into 6–10 mesh granules for a test and finally calcined at approximately 932° F.

A mixture of propene and benzene in the molar proportions of 32.8% propene and 67.2% benzene was passed under a pressure of 1900 pounds per square inch through a chamber containing 84.5 parts by weight of the synthetically prepared silica-alumina alkylation catalyst at a temperature of 530° F. During a period of four hours, 205 parts by weight of the propene-benzene mixture was charged without the formation of gas or the escape of unchanged propene. Investigation of the liquid products showed that 1.3 molar proportions of propene reacted per molar proportion of benzene. About 22.6% of the benzene-free product consisted of cumene, or isopropyl-benzene. This yield corresponded to approximately 24% of the theoretical based upon the benzene reacting, or 19% based upon the propene which reacted. A similar experiment made on some of the same propene-benzene mixture in the same apparatus filled with quartz chips gave no alkylation and 99.5% of the benzene passed therethrough was recovered unchanged.

*Example 2*

In another run some of the same propene-benzene charging stock, as used in Example 1, was contacted with the same catalyst, but with a fresh portion thereof, during a period of six hours at a catalyst temperature of approximately 840° F. under 1500 pounds pressure. During this time, approximately 392 parts by weight of the propene-benzene mixture was charged. Investigation of the liquid products showed that 1.08 molar equivalents of propene reacted for each molar equivalent of benzene reacting. The cumene fraction was 58.4% of the benzene-free product. This yield corresponded to 68% of the theoretical based upon the benzene which reacted and 56% based on the propene. The cumene fraction was identified by preparation of the diacetamino derivative, which melted at 420° F. (216° C.), the same as that value given in the literature for this derivative of cumene.

It was noticed that the alkylation reaction was more selective in the production of mono-alkylated aromatic hydrocarbon at the higher temperature used in Example 2 than was the case in Example 1.

The nature of the present invention and of its commercial utility can be seen from the specification and examples given, though neither section is intended to be unduly limiting on its generally broad scope.

We claim as our invention:

1. A process for producing alkylated aromatics which comprises reacting an aromatic with an olefin in the presence of an alkylating catalyst comprising silica, alumina and thoria.

2. The process as defined in claim 1 further characterized in that said catalyst comprises a calcined mixture of the hydrogels of silica, alumina and thoria.

3. A process for producing alkylated aromatics which comprises reacting an aromatic with an olefin in the presence of an alkylating catalyst comprising silica, alumina and thoria at a temperature in the approximate range of 350–850° F.

4. An alkylation process which comprises reacting an aromatic hydrocarbon with an olefin in the presence of a catalyst comprising silica gel, alumina and thoria.

5. An alkylation process which comprises reacting an aromatic hydrocarbon with an olefin at a temperature in the approximate range of 350–850° F. and in the presence of a catalyst comprising silica gel, alumina and thoria.

CHARLES L. THOMAS.
VLADIMIR HAENSEL.

REFERENCES CITED

The following references are of record in the file of this patent:

UNITED STATES PATENTS

| Number | Name | Date |
| --- | --- | --- |
| 1,755,496 | Behrman | Apr. 22, 1930 |
| 2,115,884 | Schollkopf | May 3, 1938 |
| 2,215,305 | Voorhees | Sept. 17, 1940 |
| 2,216,262 | Bloch | Oct. 1, 1940 |
| 2,242,960 | Sachanen | May 20, 1941 |
| 2,268,109 | Connolly | Dec. 30, 1941 |